United States Patent [19]
Gelhausen

[11] Patent Number: 5,350,044
[45] Date of Patent: Sep. 27, 1994

[54] VIBRATION DAMPER FOR MOTOR VEHICLES

[75] Inventor: Ingo Gelhausen, Fürthen, Fed. Rep. of Germany

[73] Assignee: BOGE Aktiengesellschaft, Eitorf, Fed. Rep. of Germany

[21] Appl. No.: 934,113

[22] Filed: Aug. 21, 1992

[30] Foreign Application Priority Data

Sep. 20, 1991 [DE] Fed. Rep. of Germany ....... 4131323

[51] Int. Cl.⁵ .............................................. B60G 15/00
[52] U.S. Cl. ................................. 188/322.12; 267/221
[58] Field of Search ........... 188/311, 312, 315, 322.12, 188/322.21, 322.22

[56] References Cited

U.S. PATENT DOCUMENTS

| | | | |
|---|---|---|---|
| 4,276,971 | 7/1981 | Horvath | 188/322.21 |
| 4,655,439 | 4/1987 | Handke et al. | 188/322.12 |
| 4,895,608 | 1/1990 | Bibber | 148/261 |
| 4,944,705 | 7/1990 | Kashima et al. | 188/322.15 |
| 5,078,239 | 1/1992 | Kobayashi et al. | 188/322.22 |

FOREIGN PATENT DOCUMENTS 1923239 9/1965 Fed. Rep. of Germany .
2932138 2/1981 Fed. Rep. of Germany .

*Primary Examiner*—Robert J. Oberleitner
*Assistant Examiner*—Chris Schwartz
*Attorney, Agent, or Firm*—Nils H. Ljungman & Associates

[57] ABSTRACT

A vibration damper for motor vehicles typically has an external tube, a piston rod and fastening parts for fastening the vibration damper to the wheel suspension and the vehicle body. To prevent friction and or contact corrosion on the surfaces between the external tube and the fastening parts, at least the contact surfaces are provided with a protective metallic aluminum layer.

13 Claims, 3 Drawing Sheets

VIBRATION DAMPER FOR MOTOR VEHICLES

BACKGROUND OF THE INVENTION

1. Field of the Invention

This invention relates to a vibration damper for motor vehicles, which vibration damper has increased corrosion protection at least between adjoining parts of the vibration damper. A vibration damper generally consists of at least one tube having a piston disposed therein and fastening parts for fastening the vibration damper to the wheel suspension and the vehicle body. It is generally the surfaces between the fastening parts and the tube which can result in damper failure due to corrosion.

2. Background Information

One type of vibration damper is disclosed in German Patent No. 29 32 138. This vibration damper has an external tube that is equipped with fastening straps, e.g. to connect the damper to axle spindles or steering knuckles. The external tube and the fastening straps are pressed together when the metal is bright, or untarnished (in a clean condition), whereby the components joined together in this manner perform wheel guidance tasks, while also absorbing longitudinal and transverse loads. Such a compound component is subjected to constant load changes during travel, so that corresponding forces are exerted on the joint between the fastening strap and the external tube, which forces, in the event of friction corrosion, can lead to premature rupture of the fastening strap or of the external tube. Moreover, as a result of the infiltration or penetration of moisture, crevice corrosion or contact corrosion can occur, necessarily resulting in material erosion (depth corrosion) at the connection point, which erosion can also lead to the rupture of one of the components.

OBJECT OF THE INVENTION

The object of the invention is to design a vibration damper having minimal friction and/or contact corrosion so that ruptures of external tubes and fastening parts can be prevented as much as possible while not requiring that the material be improved and/or the thickness of the material be increased, while still retaining sufficient long-term strength.

SUMMARY OF THE INVENTION

This object can be achieved by the present invention, by providing at least the contact surfaces between the external tube and the fastening parts with a protective layer.

One advantage of such a configuration is that a protective layer can be deposited on the contact surfaces between the external tube and the fastening parts, i.e. preferably on contact surfaces of those components subjected to alternating loads, and this protective layer can act on the one hand as a friction reducer between the external tube and the fastening strap, and on the other hand can result in a general improvement in corrosion protection. As a result of the reduction of the friction corrosion, premature tube ruptures or ruptures of fastening parts can be prevented. In addition to the corrosion protection, contact corrosion can also be prevented on the contact surfaces between the external tube and the fastening parts.

In accordance with an additional essential configuration of the invention, there is preferably a galvanic aluminum coating applied to the initial material as a protective coating.

In an additional favorable embodiment, an aluminum-plated material is preferably used as the initial material for the external tube and/or the fastening parts.

As a result of the application of the aluminum coating onto the contact surfaces, the service life, among other things, of the damper can thereby be improved, and, under conditions which caused premature component failure, there is no longer a need to improve the material or change the thickness of the sheet metal, because the aluminum coating generally alleviates this problem. The corrosion resistance compared to untreated materials can also be significantly improved by the present invention. As a result of using an aluminum coating on both sides of the initial materials, even on components manufactured by deep drawing, good corrosion protection can be guaranteed at points which were previously difficult to protect by the application of paint.

The aluminum coating also has the advantage over other surface coatings, such as paint, primer and zinc. During welding steps, in the formation of the vibration damper, to form the cover gas weld seams or resistance welds that are customarily used, there is typically a combustion of the protective layer of paint, primer or zinc. However, the aluminum coating, has a much higher boiling, or vaporization point compared to the other surface coatings, e.g. for aluminum, the boiling point is about 2467° C. and for zinc the boiling point is only about 907° C. Thus, during welding, which generates high temperatures, the zinc, would vaporize more readily than aluminum and no longer be present on the surface. This is also typically the case for paints and primers.

In summary, one aspect of the invention resides broadly in a vibration damper for motor vehicles, the vibration damper for dampening transmission of vibrations between a wheel suspension of the motor vehicle and a frame of the motor vehicle, the vibration damper comprising a tubular member, a fastening device disposed on the tubular member for fastening the tubular member to one of: the vehicle body and the wheel suspension, first and second chambers disposed within the tubular member, a piston apparatus for separating the first chamber from the second chamber, and a piston rod connected to the piston apparatus. The piston rod is for being connected to the other of the vehicle body and the wheel suspension. The tubular member has a first surface disposed adjacent the fastening device, and the fastening device has a second surface disposed adjacent the tubular member. At least the first surface and the second surface comprise a protective layer.

Another aspect of the invention resides broadly in a method for producing a vibration damper for a motor vehicle, the vibration damper for reducing transmission of vibrations between a wheel suspension of the motor vehicle and a frame of the motor vehicle. The vibration damper comprises an external tube, at least one fastening device disposed adjacent the external tube for fastening the external tube to one of: the wheel suspension and the body of the vehicle, a first chamber and a second chamber disposed within the external tube, a piston apparatus separating the first chamber from the second chamber, and a piston rod connected to the piston apparatus. The piston rod is for being connected to the other of the wheel suspension and the vehicle frame. The external tube has a first surface for being disposed in contact with the fastening part, and the fastening part has a second surface for being disposed in contact with the external tube. The method comprises the steps of: coating at least the first surface of the external tube and the second surface of the fastening part with a protective layer, and connecting the fastening part to the external tube with the first surface being disposed adjacent the second surface.

One additional aspect of the invention resides broadly in a vibration damper for motor vehicles, the vibration damper for damping transmission of vibrations between a wheel suspension of the motor vehicle and a frame of the motor vehicle. The vibration damper comprising: a tubular member, a fastening device disposed on the tubular member for fastening the tubular member to one of: the vehicle body and the wheel suspension, first and second chambers disposed within the tubular member, a piston apparatus for separating the first chamber from the second cheer, and a piston rod connected to the piston apparatus, the piston rod for being connected to the other of the vehicle body and the wheel suspension. The tubular member has a first surface disposed adjacent the fastening device, and the fastening device has a second surface disposed adjacent the tubular member. At least the first surface and the second surface comprise a protective layer, and the vibration damper is produced by a method comprising the steps of: coating at least the first surface of the external tube and the second surface of the fastening part with a protective layer, and connecting the fastening part to the external tube with the first surface being disposed adjacent the second surface.

BRIEF DESCRIPTION OF THE DRAWINGS

Preferred embodiments of the present invention are illustrated in the accompanying Figures, in which.

DESCRIPTION OF THE PREFERRED EMBODIMENTS

Figure 1:
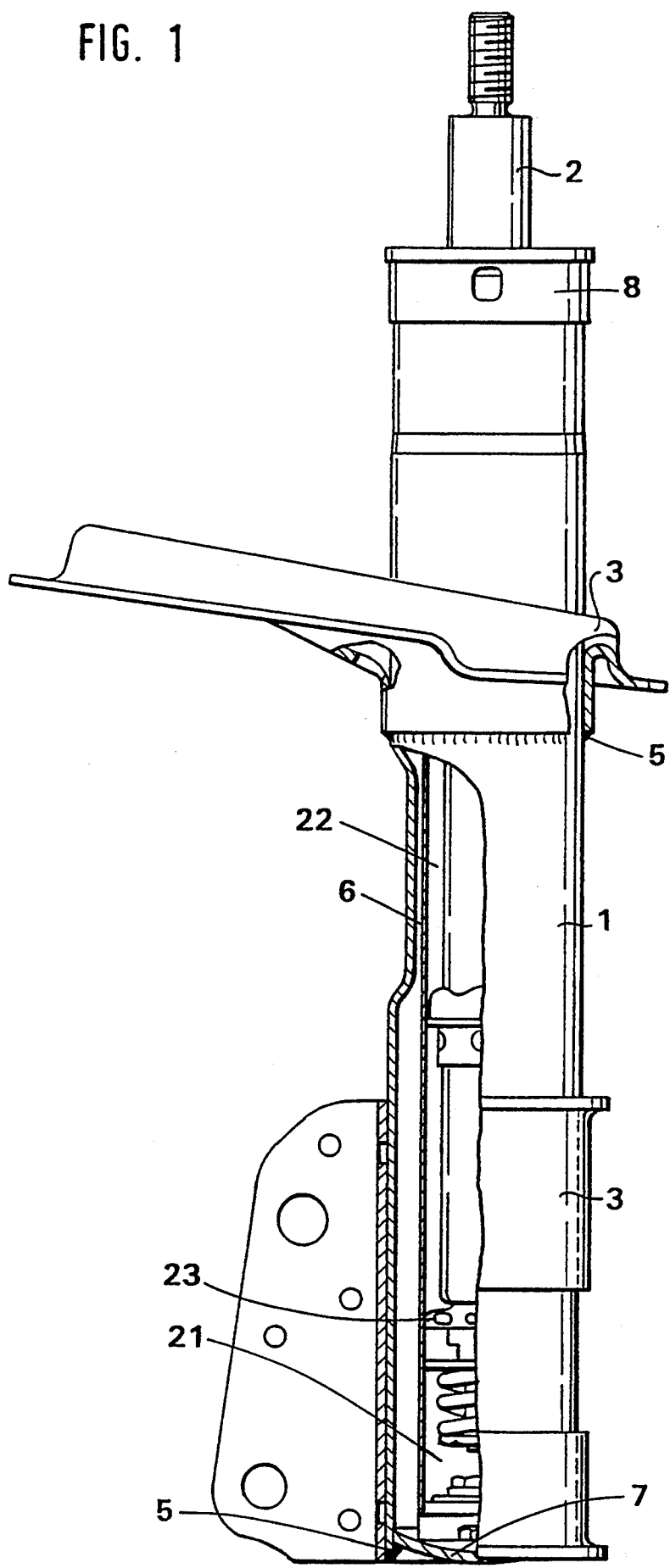
FIG. 1 shows a vibration damper in partial cross section.

FIG. 1 shows essentially an external tube 1, a piston rod 2 and fastening parts 3 of a vibration damper. The vibration damper shown preferably has a piston 23 which preferably separates the interior of an internal tube 6 into first and second chambers 21 and 22. The fastening parts 3 are used to fasten, or install the vibration damper in a vehicle. Such fastening parts 3 can generally be welded directly to the external tube 1 by means of the welds 5. One method for assembling the vibration damper can therefore be done using the following steps: the piston rod 2 can be assembled and inserted into the internal tube 6, the internal tube 6 can be inserted into the external tube 1, and can be retained therein by fastening end cap 8 into position. The external tube 1, with end piece 7, and the fastening parts 3 can be assembled by welding the end piece 7 and the fastening parts 3 into place. Once assembled, the entire damper assembly can preferably be painted to provide some corrosion protection. Individual parts of the damper could also be painted prior to assembly if desired.

Figure 2:
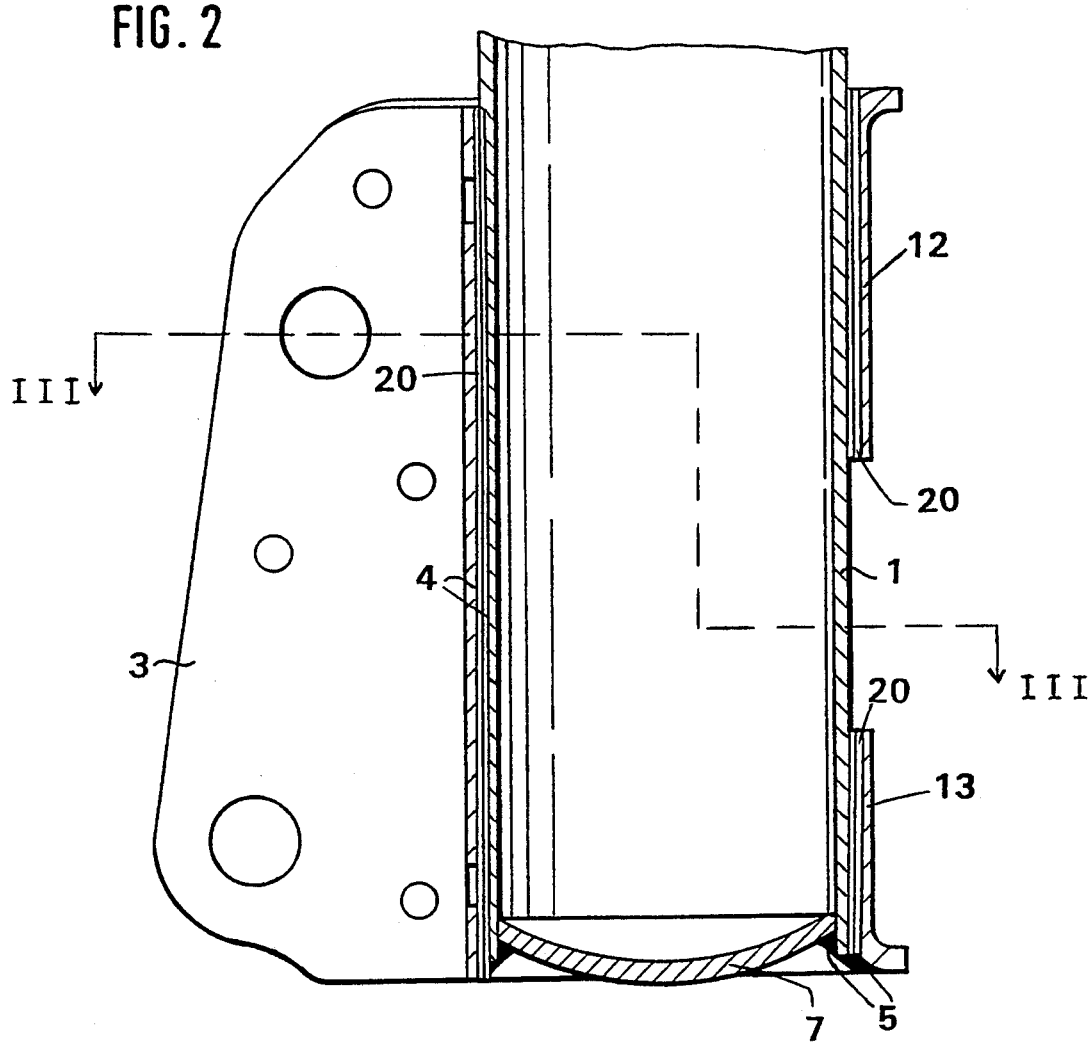
FIG. 2 shows an external tube of a vibration damper with a fastening part in cross section.
Figure 3:
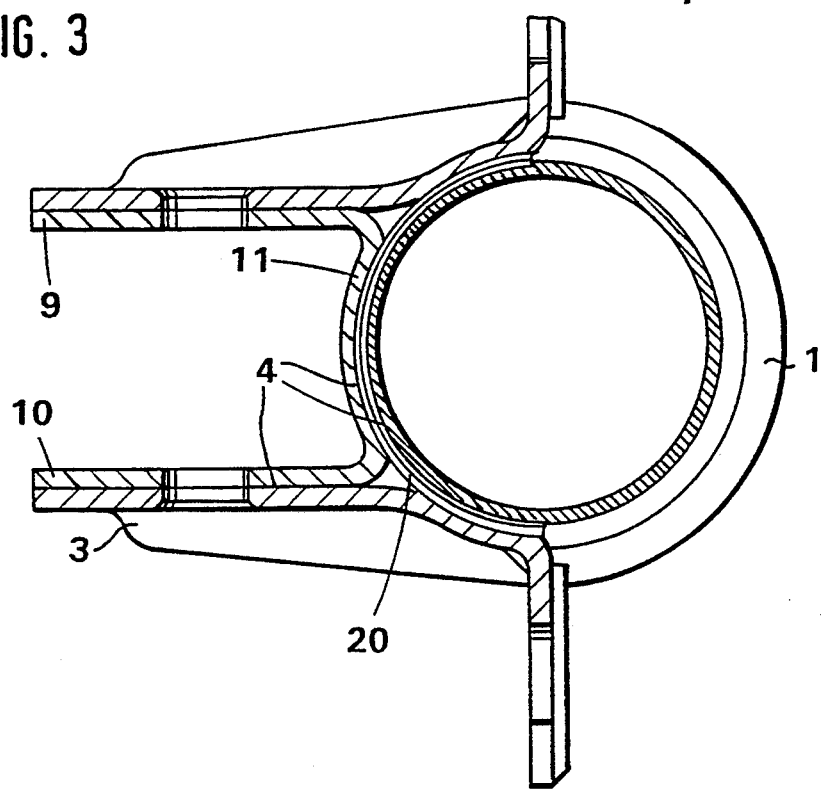
FIG. 3 shows a cross-sectional of the vibration damper illustrated in FIG. 2.

FIGS. 2 and 3 show portions of a vibration damper in cross section, with the same corresponding components as shown in FIG. 1, which components essentially are the external tube 1, and the fastening parts 3. As discussed above, the fastening parts 3 can be used to fasten the vibration damper to the wheel suspension or to the vehicle body. Also shown in FIG. 2, are the welds necessary to retain the end piece 7 and the fastening part 3 in place on the external tube 1. The weld 5 shown is disposed at the lower end of the vibration damper at the juncture of the fastening part 3 with the external tube, while a single weld, or an additional weld, could also be provided at the upper end of the fastening part 3. Such welds are preferable to retain the fastening parts 3 rigidly on the external tube so that the vibration damper can function in its capacity of absorbing shocks applied thereto without a loosening of the fastening parts 3 from the external tube 1. Other types of fastening methods and devices which are capable of rigidly retaining the fastening parts in place could also be used.

The fastening part 3 shown in FIGS. 2 and 3 essentially has a U-shaped flange portion which extends away from the external tube 1. Each of the extending arms 9 and 10 of this flange can have a number of holes therein to allow the fastening part 3 to be bolted to the vehicle body or wheel suspension. This U-shaped flange also has a base portion 11 between the two arms 9 and 10. This base portion can form a part of the contact surface 4 of the fastening part 3. The other contact surfaces 4 of the fastening part 3 can be substantially provided by the two cylindrical sleeves 12 and 13 which are preferably disposed about the circumference of the external tube 1.

As a result of the connection of fastening parts 3 directly to the external tube 1, surfaces 4, preferably in intimate contact with one another, are formed. These surfaces 4 are subjected to constantly changing loads when the vehicle is in motion, thereby being subjected to friction corrosion, and these surfaces 4, can also be subject to corrosion if there is any moisture penetration therein. Even though such surfaces 4 can be protected by painting, welding the parts together often can destroy the integrity of the applied paint, thereby causing a loss of corrosion protection around the weld. The exposed surfaces around the weld could be repainted, but additional paint protection can essentially no longer be applied to the contact surfaces 4.

Thus, to achieve satisfactory corrosion protection for the vibration damper, at least the contact surfaces 4 should be provided with an alternative, more suitable protective coating. This protective coating can preferably be a galvanic aluminum coating, or alternatively, the initial materials used for the parts can be aluminum plated. Since aluminum is essentially more resistant to corrosion, and has a high boiling point, the aluminum would not be destroyed during the welding steps if the welding steps are carried out such that a temperature at the intimately contacting surfaces 4 adjacent the welding essentially does not reach the boiling point of aluminum, or about 2467° C., and thus, because the aluminum is not vaporized, the aluminum therefore would give the damper increased protection from corrosion at the contact surfaces 4. In addition to the increased corrosion protection, the aluminum also can provide a reduced friction coefficient at the surfaces 4, thereby causing there to be less friction wear, or friction corrosion at the surfaces 4 during load changes.

Figure 4:
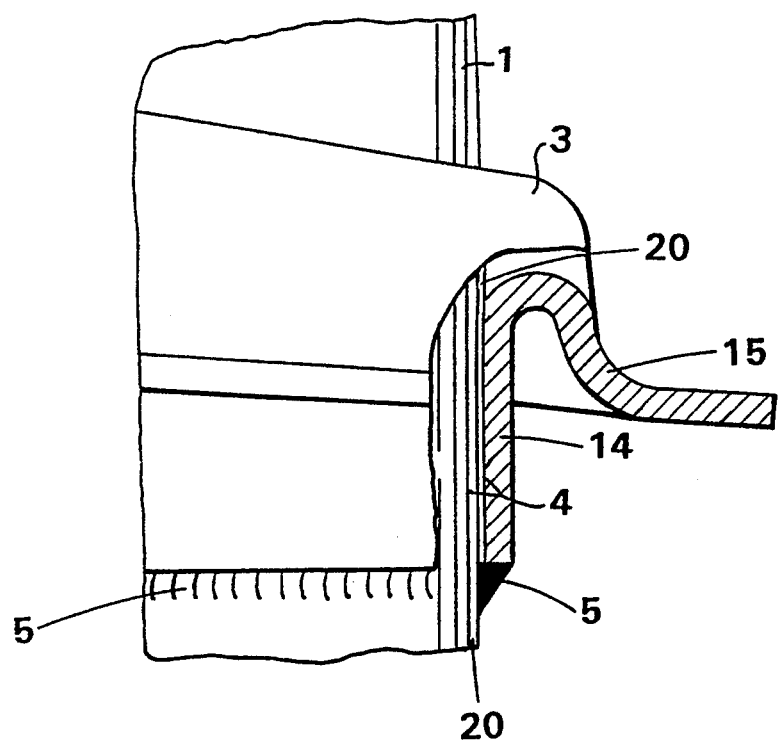
FIG. 4 shows a detail of a spring plate as a fastening part.

FIG. 4 shows a detail of the spring plate illustrated in FIG. 1, whereby the fastening part 3 can again be provided with a protective coating, at least in the vicinity of the contact surface 4. The spring plate itself is essentially configured to retain an end of a suspension spring, not shown, therein. Thus, the spring plate can be a molded, or pressed, metal plate of an essentially single layer of metal, bent in a manner to match the configuration of the end of the spring, with a portion 14 for contacting the external tube 1 and a portion 15 extending away from the external tube 1. The weld 5 for retaining the fastening part 3, the spring plate, to the external tube is also shown. Such a weld is also preferably made at a temperature lower than the vaporization temperature of aluminum, or about 2467° C.

One feature of the invention resides broadly in a vibration damper for motor vehicles, consisting of an external tube, a piston rod and fastening parts for fastening to the wheel suspension and the vehicle body, characterized by the fact that at least the contact surfaces 4 formed between external tube 1 and the fastening parts 3 are provided with a protective coating 20.

Another feature of the invention resides broadly in a vibration damper characterized by the fact that there is a galvanic aluminum coating on the initial material as a protective layer.

Yet another feature of the invention resides broadly in a vibration damper characterized by the fact that an aluminum-plated, or aluminum clad, material is used as the initial material for the external tube 1 and or the fastening parts 3.

Some types of vibration dampers having welds thereon, or having parts welded thereto are disclosed in the following patents: U.S. Pat. No. 4,953,778 to Critton et. al., entitled "Method of Making Torsional Vibration Damper Having a Roll Spun Housing"; U.S. Pat. No. 4,872,369 to Critton et. al., entitled "Torsional Vibration Damper Having a Roll Spun Housing and Other Improvements"; U.S. Pat. No. 4,669,586 to Mettler, entitled "Pipe-Type Housing for a Shock Absorber Particularly of the Telescopic Vibration Damper Type"; U.S. Pat. No. 4,660,436 to Dayoust and Pelus, entitled "Viscous Vibration Dampers"; and U.S. Pat. No. 3,901,359 to Jentsch, entitled "Hydraulic Twin-Tube Vibration Damper".

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for motor vehicles, the vibration damper for dampening transmission of vibrations between a wheel suspension of the motor vehicle and a frame of the motor vehicle, the vibration damper comprising:
    a tubular member;
    fastening means rigidly attached to said tubular member for fastening said tubular member to one of: the vehicle body and the wheel suspension;
    first and second chambers disposed within said tubular member;
    piston means for separating said first chamber from said second chamber;
    a piston rod connected to said piston means, said piston rod for being connected to the other of the vehicle body and the wheel suspension;
    said tubular member having a first surface disposed adjacent said fastening means;
    said fastening means having a second surface disposed adjacent said tubular member;
    said first surface and said second surface being disposed in intimate contact with one another; and
    at least said first surface and said second surface comprising a protective layer of metallic aluminum disposed thereon to cover said first surface and said second surface, said protective layer of aluminum being configured to provide at least one of:
        reduced friction between said tubular member and said fastening means during alternating loads produced during use, said reduced friction being less than friction between said tubular member and said fastening means without said protective layer of metallic aluminum; and
        increased corrosion protection for at least said contacting first and second surfaces, said increased corrosion protection being greater than corrosion protection without said protective layer of aluminum.

2. The vibration damper according to claim 1, wherein said protective layer comprises a galvanic aluminum layer.

3. The vibration damper according to claim 2, wherein said fastening means and said tubular member are aluminum plated.

4. The vibration damper according to claim 3, wherein:
    said fastening means is welded to said tubular member at a weld;
    a substantial portion of said aluminum protective layer on the contacting first and second surfaces having not been vaporized during the welding, the welding having been performed such that a temperature of the contacting surfaces did not attain a temperature at which a substantial portion of said aluminum on the contacting surfaces was vaporized.

5. The vibration damper according to claim 4, wherein:
    said aluminum protective layer has a structural integrity, the structural integrity of the coating being retained adjacent the weld;
    said damper has a first end portion and a second end portion, said piston rod extending from said first end portion and said second end portion comprising a cap, said cap being welded to said tubular member;
    said fastening means being connected at said second end portion, and said fastening means and said cap being welded to said tubular member by an integral weld at a said second end portion;

said damper additionally comprises a spring plate for retaining a spring of the suspension system, said spring plate being configured for receiving an end of the spring therein, and said spring plate comprising:

a first portion disposed about said tubular member, said first portion having a third surface for being disposed in intimate contact with said tubular member, a second portion adjacent said first portion and bent through an angle of about 180° from said first portion, at least a part of said second portion being disposed substantially parallel to said first portion, and a third portion adjacent said second portion, said third portion extending away from said damper;

said external tube has a fourth surface for being in intimate contact with said third surface of said spring plate;

said third surface and said fourth surface comprising said protective layer of metallic aluminum thereon;

said spring plate is welded to said tubular member at a second weld, said welding having been performed at said temperature less than the temperature at which metallic aluminum is vaporized whereby said aluminum on said third surface and said fourth surface was not vaporized during said welding;

said fastening means comprises:

a first cylindrical portion for being disposed about said tubular member;

a second cylindrical portion for being disposed about said tubular member, said second cylindrical portion being spaced apart from said first cylindrical portion;

at least one U-shaped flange connecting said first cylindrical portion to said second cylindrical portion, said at least one U-shaped flange having a base portion for being disposed in intimate contact with said tubular member, and two extending arms extending away from said base portion;

each of said at least two extending arms having orifices therein for said fastening of said tubular member to one of: the vehicle suspension and the vehicle body;

said first and said second cylindrical portions and said base portion comprising at least a part of said second surface of said fastening means; and said temperature at which metallic aluminum is vaporized is about 2467° C.

6. A method for producing, providing corrosion protection for, and reducing friction in a vibration damper for a motor vehicle, the vibration damper of reducing transmission of vibrations between a wheel suspension of the motor vehicle and a frame of the motor vehicle, the vibration damper comprising an external tube, at least one fastening part disposed adjacent the external tube for fastening the external tube to one of: the wheel suspension and the body of the vehicle, the external tube having a first surface for being disposed in contact with the fastening part, and the fastening part having a second surface for being disposed in contact with the external tube, said method comprising the steps of:

providing the external tube;
providing the fastening part;

depositing a protective layer of metallic aluminum on at least the first surfaced of the external tube and the second surface of the fastening part to at least one of:

reduce friction between said first surface and said second surface during alternating loads produced during use, and increase corrosion protection of said first surface and said second surface, when said first surface and said second surface are disposed in contact with one another;

welding the fastening part to the external tube with the first surface of the external tube being disposed in contact with the second surface of the fastening part; and performing said welding at a temperature such that the adjacent first and second surfaces do not attain a temperature at which a substantial portion of said protective layer of metallic aluminum on the first and second surfaces is vaporized.

7. The method according to claim 6, wherein said step of depositing comprises depositing a galvanic aluminum layer on at least the first surface of the external tube and the second surface of the fastening part.

8. The method according to claim 7, wherein said step of depositing comprises plating aluminum onto at least said first surface of said external tube and said second surface of said fastening part.

9. The method according to claim 8, wherein said vibration damper further comprises:

a first end portion and a second end portion disposed opposite to said first end portion, said second end portion comprising a cap, said cap being welded to said tubular member;

a spring plate for retaining a spring of the suspension system, said spring plate being configured for receiving and end of the spring therein, and said spring plate comprises:

a first portion disposed about said tubular member, said first portion having a third surface for being disposed in intimate contact with said tubular member, a second portion adjacent said first portion and bent through an angle of about 180° from said first portion, at least a part of said second portion being disposed substantially parallel to said first portion, and a third portion adjacent said second portion, said third portion extending away from said damper;

said external tube has a fourth surface for being in intimate contact with said third surface of said spring plate; and said method further comprises:

providing said cap;

disposing said cap adjacent said second end portion of said tubular member;

welding said cap and said fastening means to said tubular member by an integral weld at said second end portion;

providing said spring plate;

depositing a protective layer of metallic aluminum on said third surface of said spring plate and said fourth surface of said tubular member to at least one of;

reduce friction between said first surface and said second surface, and increase corrosion protection of said first surface and said second surface, when said third surface and said fourth surface are disposed in contact with one another;

welding said spring plate to said tubular member with said third surface disposed in contact with said fourth surface; and performing said welding at a temperature whereby a temperature of the contacting third and fourth surfaces does not attain a temperature a which a substantial portion of the metallic aluminum on the contacting third and fourth surfaces is vaporized, said temperature at which metallic aluminum is vaporized being about 2467° C.

10. A vibration damper for a motor vehicle, said vibration damper for damping transmission of vibrations between a wheel suspension of the motor vehicle and a frame of the motor vehicle, said vibration damper comprising:

a tubular member;

fastening means disposed on said tubular member for fastening said tubular member to one of: the vehicle body and the wheel suspension;

first and second chambers disposed within said tubular member;

piston means for separating said first chamber from said second chamber;

a piston rod connected to said piston means, said piston rod for being connected to the other of the vehicle body and the wheel suspension;

said tubular member having a first surface disposed in contact with said fastening means;

said fastening means having a second surface disposed in contact with said tubular member;

at least said first surface and said second surface comprising a protective layer of metallic aluminum disposed thereon, said protective layer of metallic aluminum being configured to provide at least one of:

reduced friction between said tubular member and said fastening means during alternating loads produced during use, said reduced friction being less than friction between said tubular member and said fastening means without said protective layer of metallic aluminum; and increased corrosion protection for at least said contacting first and second surfaces, said increased corrosion protection being greater than corrosion protection without said protective layer of aluminum when said first surface and said second surface are disposed in contact with one another; and said vibration damper having been produced by a method comprising the steps of:

depositing the protective layer of aluminum on at least the first surface of the external tube and the second surface of the fastening part; and welding the fastening part to the external tube with the first surface in contact with the second surface, said welding having been performed such that a temperature of the contacting surfaces did not attain a temperature at which a substantial portion of the metallic aluminum on the contacting surfaces was vaporized.

11. The vibration damper according to claim 10, wherein said protective layer comprises a galvanic aluminum layer and said step of depositing comprises galvanically applying an aluminum layer to at least the first surface and the second surface.

12. The vibration damper according to claim 10, wherein said protective layer comprises an aluminum plated layer, and said step of depositing comprises plating aluminum onto at least said first surface and said second surface.

13. The vibration damper according to claim 12, wherein:

said damper has a first end portion and a second end portion, said piston rod extending from said first end portion and said second end portion comprising a cap, said cap being welded to said tubular member;

said fastening means being connected at said second end portion, and said fastening means and said cap being welded to said tubular member by an integral weld at a said second end portion;

said damper additionally comprises a spring plate for retaining a spring of the suspension system, said spring plate being configured for receiving an end of the spring therein, and said spring plate comprising:

a first portion disposed about said tubular member, said first portion having a third surface for being disposed in intimate contact with said tubular member, a second portion adjacent said first portion and bent through an angle of about 180° from said first portion, at least a part of said second portion being disposed substantially parallel to said first portion, and a third portion adjacent said second portion, said third portion extending away from said damper;

said external tube has a fourth surface for being in intimate contact with said third surface of said spring plate;

said third surface and said fourth surface comprising said protective layer thereon;

said spring plate is welded to said tubular member, said welding having been performed whereby a temperature of the contacting third and fourth surfaces does not attain a temperature at which a substantial portion of the metallic aluminum protective layer on the contacting third and fourth surfaces is vaporized;

said fastening means comprises:

a first cylindrical portion for being disposed about said tubular member;

a second cylindrical portion for being disposed about said tubular member, said second cylindrical portion being spaced apart from said first cylindrical portion;

at least one U-shaped flange connecting said first cylindrical portion to said second cylindrical portion, said at least one U-shaped flange having a base portion for being disposed in intimate contact with said tubular member, and two extending arms extending away form said base portion;

each of said at least two extending arms having orifices therein for said fastening of said tubular member to one of: the vehicle suspension and the vehicle body;

said first and said second cylindrical portions and said base portion comprising at least a part of said second surface of said fastening means; and said temperature at which metallic aluminum is vaporized is about 2467° C.

* * * * *

UNITED STATES PATENT AND TRADEMARK OFFICE
CERTIFICATE OF CORRECTION

PATENT NO. : 5,350,044
DATED : September 27, 1994
INVENTOR(S) : Ingo GELHAUSEN

It is certified that error appears in the above-identified patent and that said Letters Patent is hereby corrected as shown below:

In column 3, line 18, after 'second', delete "cheer" and insert --chamber--.

In column 3, line 40, after 'cross-sectional' insert --view--.

In column 5, line 42, after 'to', delete "Dayoust" and insert --Davoust--.

In column 8, line 2, Claim 6, after 'first', delete "surfaced" and insert --surface--.

In column 9, line 8, Claim 9, after 'temperature', delete "a" and insert --at--.

In column 10, line 57, Claim 13, after 'away', delete "form" and insert --from--.

Signed and Sealed this

Nineteenth Day of May, 1998

Attest:

BRUCE LEHMAN

Attesting Officer

Commissioner of Patents and Trademarks